May 6, 1969 C. E. ANDERSON ET AL 3,442,286
LUBRICATED GATE VALVE HAVING LINE LOAD BEARING CAPABILITY
Filed Jan. 25, 1965

INVENTORS
CLIFFORD E. ANDERSON
WILLIAM E. LOWREY
BY
*James F. Jackson*
AGENT

United States Patent Office 3,442,286
Patented May 6, 1969

3,442,286
LUBRICATED GATE VALVE HAVING LINE
LOAD BEARING CAPABILITY
Clifford E. Anderson and William E. Lowrey, Houston,
Tex., assignors to ACF Industries, Incorporated, New
York, N.Y., a corporation of New Jersey
Filed Jan. 25, 1965, Ser. No. 427,807
Int. Cl. F16k 3/36, 5/22
U.S. Cl. 137—246.22                                    2 Claims

ABSTRACT OF THE DISCLOSURE

A valve having a line load bearing core including a relatively rigid seat box unit and generally flexible tubular hubs connected to the seat box unit. A portion of the load bearing core being surrounded by a relatively thin flexible body shell which is capable of containing fluid pressure and which flexes with the load bearing core under line loads.

---

This invention relates generally to valves, and more particularly to fabricated gate valves for controlling the flow of fluid through pipelines.

Historically, valve bodies for large valves have been cast, however, the cost of patterns and the maintenance of foundry equipment for the casting process represents a large initial expense which, if the number to be cast is small, makes the cost of the casting relatively large. Scrapping of cast valve bodies due to casting imperfections, such as blow holes, porous metal, etc., also tends to increase the cost of cast valve bodies. With a view toward the production of low cost reliable valve structures, efforts have been made to fabricate valve bodies from plate metal or from combinations of forgings or castings and plate metal.

A prime consideration in the fabrication of valve bodies involves the design and construction of the center section or seat retainer portion of the valve body. In the past fabricated valves have generally been constructed of sufficiently heavy plate or tubing so that the pressure chamber or body portion of the valve will carry, in addition to the internal stresses applied by the pressurized lading, the external loads applied to the body by the pipeline. The valve body walls of the valve therefore must be constructed sufficiently strong to withstand these combined internal and external stresses. Obviously the plate or tubular stock from which valves of this type are constructed must be extremely strong, thereby requiring that the valve be quite heavy in construction. Valves so constructed in addition to being quite heavy are also quite costly.

Another problem inherent in fabricated valves involves the maintenance of quality control. For example, valves are frequently fabricated by welding overlapped portions of the valve construction, or by placing a number of welds in close proximity to one another. The detection of flaws in welded connections is generally accomplished by radiological detection, for example by exposing photographic plates by radiation passed through the welds from a source of radiation. When overlapped materials are welded, or when multiple material thicknesses or multiple welds are involved, it becomes quite difficult to detect imperfections in welds. Moreover these conditions frequently give false indications of imperfections which are not present, thereby possibly resulting in unnecessary scrapping of material.

Accordingly, it is a principal object of this invention to provide a novel fabricated valve having a relatively thin body portion adapted to withstand substantially all of the forces produced by the pressurized lading and having a load bearing core adapted to absorb substantially all of the line loads to which the valve is subjected.

It is an object of this invention to provide a novel fabricated valve composed essentially of parts obtained from plate and tubing stock and which is adapted by the novel construction for proper sealing during maximum load and pressure conditions.

It is a further object of this invention to provide a novel fabricated valve, having weld connections which are specifically designed for radiological detection of imperfections.

It is a further object of this invention to provide a novel fabricated valve having a load bearing core including a seat box and gate guide unit, the position and shape of which is adapted to remain substantially static, even though said core may be flexed or otherwise distorted by line loads.

It is an even further object of this invention to provide a novel fabricated valve, having a load bearing core including a seat retainer and gate guide unit, which is relatively inflexible to allow the maintenance of sealing between the seat assemblies and the gate of the valve, even though the structural core of the valve may be subject to substantial flexing by line loads.

It is among the objects of this invention to provide a novel valve construction having spaced interior and exterior strutcures being subject to relative multidirectional movement and having fluid transmitting structure for conducting fluid between said interior and exterior structures without impairing said relative movement.

An even further object of this invention contemplates the provision of a novel fabricated gate valve, which is light in weight, inexpensive in manufacture and reliable in use.

Briefly, the invention involves a fabricated gate valve having a valve body, which is composed essentially of parts formed from plate or tubing stock. The valve body is formed by surrounding a structural core, sufficiently strong to carry external line loads with a relatively thin pressure chamber of sufficient strength only to contain the pressurized lading. The structural core of the valve is formed by a pair of tubular conduits, forming inlet and outlet passages of the valve, which are fixed one to either side of a relatively rigid seat box unit. The seat box unit serves as a seat retainer for valve seat assemblies and is provided with a transverse gate passage for maintaining alignment of the gate with the seat assemblies. The valve includes novel seat lubrication structure which effectively spans the space between the body and the seat box unit and in no way interferes with relative movement between the body wall and the seat box structure.

Various other objects of the present invention will become apparent on an understanding of the following description taken in conjunction with the accompanying drawings in which.

Figure 1:
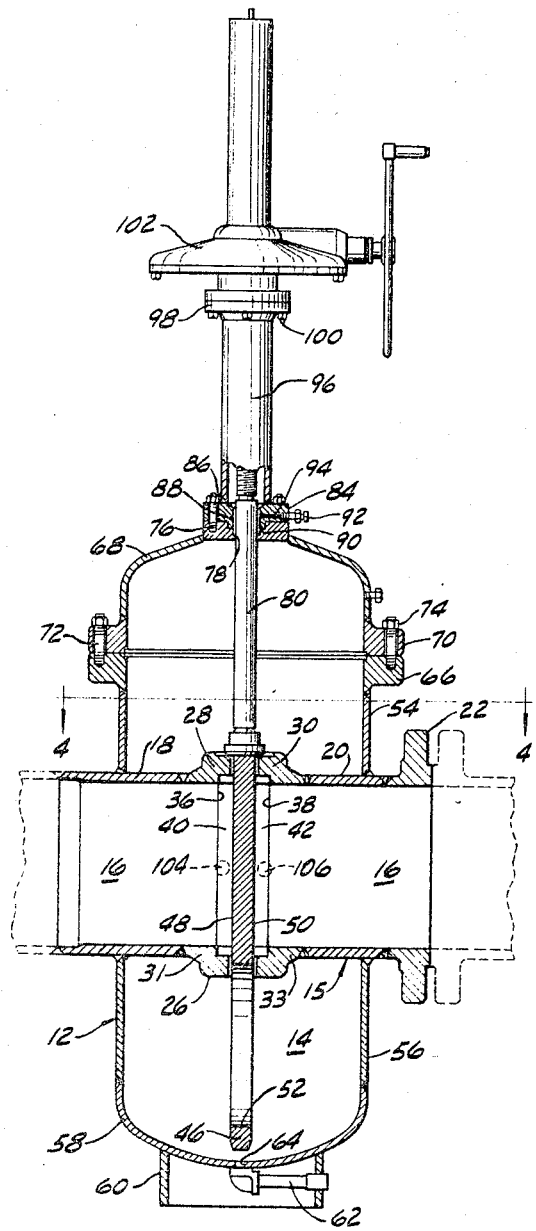
FIGURE 1 is an elevational view in section illustrating a gate valve in accordance with the principles of the present invention.
Figure 4:
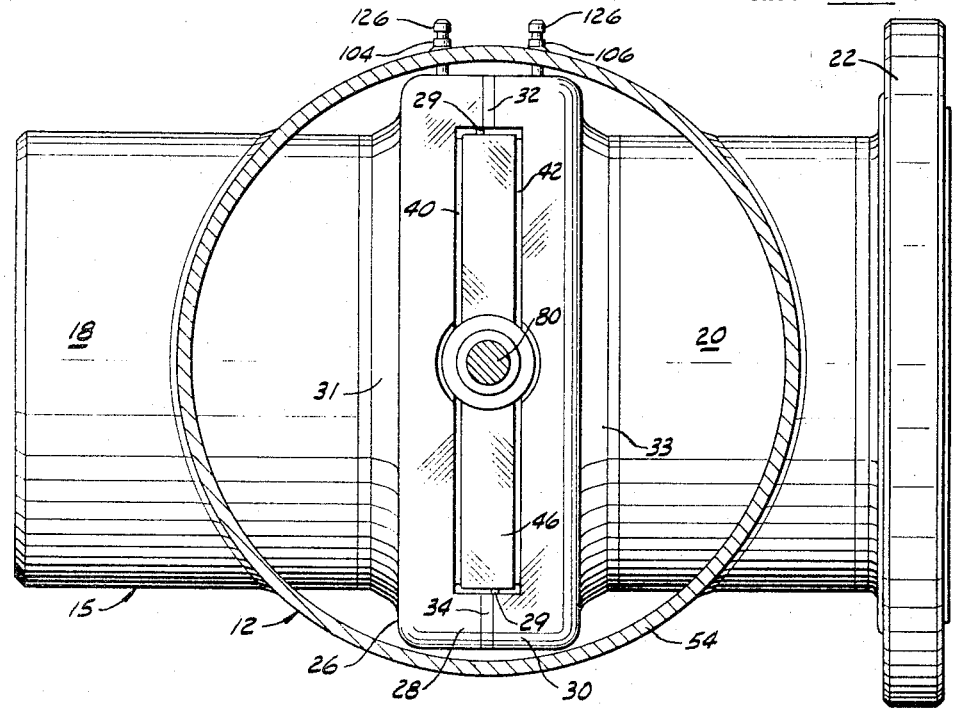
FIGURE 4 is a sectional view of the valve of FIGURE 1 taken along lines 4—4 in FIGURE 1.
Figure 6:
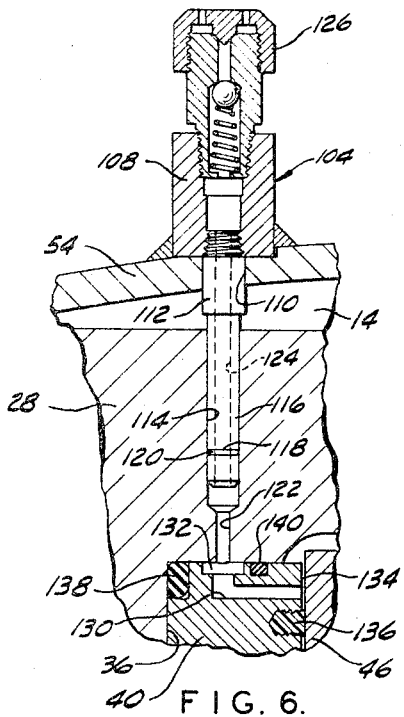
FIGURE 6 is a partial sectional view of FIGURE 4, illustrating the seat lubrication structure in detail.
Figure 5:
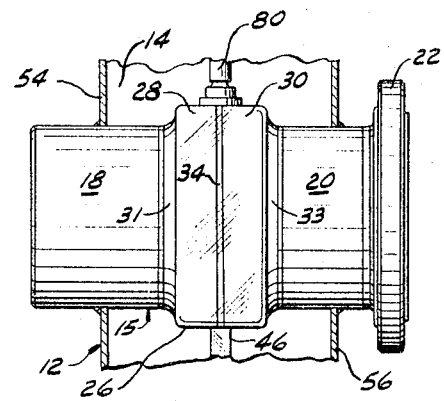
FIGURE 5 is a partial elevational view of the load bearing core construction of FIGURE 1 with the body broken away and shown in partial section.

Referring now to the drawings for a more complete understanding of this invention, a gate valve, illustrated generally at 10 in FIGURE 1, has a valve body portion 12 thereof defining a valve chamber 14. The valve body portion 12 of the valve 10 is provided with a line load bearing core 15 extending therethrough and having a through conduit 16 formed in part by a pair of spaced, generally cylindrical tubular hubs 18 and 20 defining inlet and outlet passages of the valve. As illustrated at the right portion of FIGURE 1, either of the hubs may be provided with a flange 22 for the connection of the valve into a flanged pipeline or, as illustrated at the left portion of FIGURE 1, the hubs may be machined at the outer extremity thereof for welded connection of the valve into a pipeline. The hubs might also be provided with outher conventional connection structure without departing from the spirit or scope of this invention. The flange 22 may be formed from relatively thick plate stock and welded to the hub 20, as illustrated in FIGURE 1, thereby forming a single thickness weld which may be easily inspected by radiological detection equipment for weld imperfections. Forming the central portion of the through conduit 16 and involving an important part of this invention, a relatively rigid seat box unit 26 is welded at either end thereof to the hubs 18 and 20 and is supported within the valve chamber 14 in spaced relation with the walls defining the valve body, as illustrated in FIGURE 4. The seat box portion of the load bearing core 15 is formed by a pair of substantially identical generally rectangular structural members 28 and 30, having generally circular weld flanges 31 and 33 thereon, which are welded respectively to the inner extremities of the hubs 18 and 20, as illustrated in FIGURE 1. The structural members 28 and 30 are interconnected by a pair of vertical welds 32 and 34, as illustrated in FIGURES 4 and 5, which form the structural members 28 and 30 into an extremely rigid boxlike seat retainer and gate guide structure. Each of the identical structural members 28 and 30 is preferably cast and includes a gate stop projection 29 (FIGURE 4). When the structural members 28 and 30 have been welded together to form the seat box unit 26, the projections 29 cooperate to limit movement of the gate 46 transversely to the axis of the stem 80. A pair of opposed seat recesses 36 and 38 formed respectively in the structural members 28 and 30 of the seat box 26, retain a pair of valve seat rings or seat assemblies 40 and 42 movably disposed therein. Reference may be had to FIGURE 6 for a more detailed illustration of the seat rings 40 and 42. Each of the seat rings 40 and 42 is disposed for axial movement within the seat recesses 36 and 38, respectively. The seat box unit 26 is provided with a substantially rectangular opening 44 transversely disposed relative to the axis of the through conduit 16. A gate member 46, having a pair of substantially planar parallel sealing surfaces 48 and 50 thereon, is disposed within the gate passage 44 in sealing engagement with each of the seat assemblies 40 and 42, and is movable from a closed position (FIGURE 1), where a solid portion of the gate 46 blocks the through conduit 16 to close the valve, to an open position where a port 52 formed in the gate 46 is aligned with the through conduit 16 to allow the flow of fluid through the valve.

As indicated hereinabove, the load bearing core 15 of the valve 10 is constructed of sufficient strength to withstand the loads subjected to the valve by the pipeline to which the valve is connected. The seat box unit 26 of the central core 15 effectively forms a bridge to transmit the external line loads through the valve without impairing the sealing ability of the valve. The novel load bearing core additionally is adapted to withstand a substantial amount of flexing due to line loads without excessively distorting the seat box portion of the core. The hub members 18 and 20 are relatively flexible and the seat box unit is relatively rigid in comparison. Line loads applied to the valve, therefore, will result in substantially balanced distortion or flexing of the hubs 18 and 20 while the seat box unit, since it is extremely rigid and centrally located within the valve, will be distorted only an imperceptible amount at maximum line loads and pressure range. The net effect produced by the combination of the flexible hubs with the rigid seat box unit allows the seat recesses of the seat box unit to remain in a substantially static position within the valve, and to remain substantially parallel to one another during all load and pressure conditions for which the valve is designed. The valve seats, therefore, will be allowed to continually maintain proper sealing engagement with the gate even though the core 15 is subjected to considerable bending.

Figure 2:
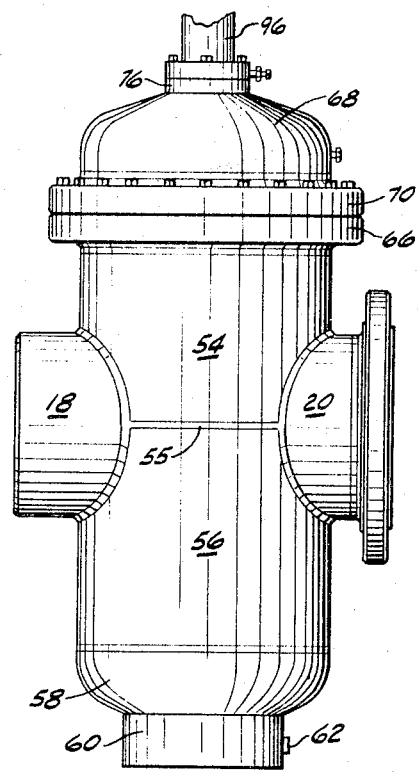
FIGURE 2 is a partial elevational view of the valve of FIGURE 1, illustrating weld connections of the body.
Figure 3:
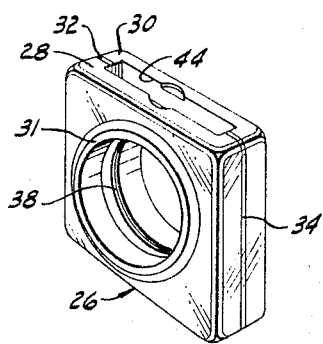
FIGURE 3 is a perspective of the seat box structure of FIGURE 1.

The body portion 12 of the valve 10 is formed by relatively thin upper and lower generally cylindrical tubes 54 and 56, respectively, which are fitted about the core 15 and welded to the hub members 18 and 20 intermediate to the extremities thereof. The upper and lower cylindrical tubes 54 and 56 are also fixed one to the other by a weld 55, as illustrated in FIGURE 2. To the lower cylindrical tube 56 is fixed a lower closure member 58 formed of dish-shaped sheet material, which may be formed by deforming a circular sheet of plate metal, for example. A generally cylindrical valve base 60 is welded to the exterior of the closure 58 to form a support for the valve. A valve drain fitting 62 is welded to the closure 58 and is in communication with the valve chamber 14 through a drain port 64 formed in the closure 58. A substantially circular flange 66, which may be formed from relatively thick plate stock, is welded to the upper extremity of the upper cylindrical body member 54 to form an annular bonnet support flange. To provide for accurate radiological inspection of the welds, the flange 66 like the flange 22 is provided with a circular weld flange so that the flange 66 may be welded to the tube 54 with a single thickness weld without overlapping the parts to be connected. A bonnet 68, having a shape similar to the shape of the lower closure 58, has a bonnet flange 70 welded thereto, which is removably fixed to the flange 66 by a series of studs 72, threaded into the flange 66 and retained by a series of nuts 74. A packing adapter flange 76 is fixed to the upper portion of the bonnet 68 by welding and is provided with a stem bore 78 of sufficient dimension to permit the passage of the valve stem 80 therethrough.

A yoke tube base plate 84 is fixed to the packing adapter plate 76 by a series of cap screws 86. The packing adapter plate 76 and the yoke tube base plate 84 are formed with enlarged bores therein which cooperate to form an annular packing chamber 88. The packing chamber 88 is provided with a packing assembly 90 for the establishment of a fluidtight seal between the packing chamber and the valve stem 80 to prevent the leakage of fluid along the valve stem. A packing adjustment fitting 92 is fixed to the yoke tube base plate 82 and is in communication with the packing chamber 88 through a bore 94. In the event of leakage through the packing, the packing adjustment fitting 92 may be manually adjusted, thereby forcing additional packing material into the packing chamber to repressurize the packing. A yoke tube 96, surrounding a portion of the upper extremity of the stem 80, is provided with a flange 98, through which a series of cap screws 100 pass for the connection of a gear operator 102 to the yoke tube 96. Any one of a number of commercially available operators, such as hydraulic operators, electric operators, or the like, may be substituted for the gear operator 102, illustrated in FIGURE 2, without departing from the spirit or scope of this invention. It is merely necessary that the operator 102 be provided with a mechanism for causing reciprocating of the valve stem 80, which raises and lowers the gate 46 as desired.

As illustrated in FIGURE 4 and as shown in detail in FIGURE 6, a pair of identical seat lubrication structures 104 and 106 are provided for the purpose of introducing lubricant into each of the seat recesses 36 and 38, to aid in the establishment of a fluidtight seal between the seats 40–42 and the gate 46. For purposes of explanation only, one of the lubrication structures is illustrated in FIGURE 4. An internally threaded collar 108 is welded to the generally cylindrical wall tube 54 about an opening 110 formed therein. A lubricant tube 112 is threadedly engaged with the collar 108 and extends into the valve chamber 14. The structural member 28 is provided with a bore 114, which is slightly larger and longer than the reduced diameter inner extremity 116 of the lubricant tube 112 and which receives the inner extremity of the tube 112 in sliding engagement therewith. The lubricant tube 112 is formed with an annular groove 118 therearound, which receives a resilient O-ring type sealing member 120 for the establishment of a seal between the tube 112 and the bore 114. The depth of the groove 118 is less than the cross-sectional dimension of the O-ring 120, thereby causing the O-ring to be slightly compressed between the bottom of the groove 118 and the cylindrical surface of the bore 114, to assure the establishment of a seal. A lubricant passage 122 is formed in the structural member 28 for communication of lubricant from the bore 114 to the seat recess 36. The lubricant tube 112 is provided with an internal passage 124 for conducting lubricant to the bore 122.

At the outer extremity of the collar 108 is threadedly attached a lubricant check valve assembly 126 to provide for the selective introduction of lubricant into the lubrication structure. Any of a number of acceptable commercially available check valve assemblies might be successfully employed in the invention without departing from the spirit or the scope thereof.

Each of the valve seats 40 and 42 are provided with a series of lubricant passages 130 which extend from the bottom wall of an exterior peripheral annular groove 132 to the face surface 134 of the seat adjacent to and radially outwardly from an annular plastic seat insert 136. The annular groove 132 and the inlet portion of the lubricant passage 130 in the seat ring are substantially in alignment with the lubricant passage 122 in the structural member 28. To prevent the flow of lubricant into the valve chamber 14 from the lubrication structures, a pair of O-ring type sealing members 138 and 140 are retained within annular grooves in the seat ring and are maintained in light compression between the seat and the seat recess walls, for the establishment of a fluidtight seal therebetween. For a more detailed description of the seat structure illustrated in FIGURE 4, reference may be had to Patent No. 3,078,865 to Estes et al., and especially to FIGURE 6 of the above patent and its related explanation. This specific seat structure, however, is not intended as limiting in regard to this invention. Any suitable seat or seat assemblies might be employed with this invention without departing from the spirit or the scope hereof.

As pointed out above, the load bearing core 15 of the valve is subject to flexing of the hubs 18 and 20 thereof by line loads, while the position of the seat box portion of the core will remain substantially static in relation to the body portion 12. The body portion 12, however, being fabricated of relatively thin flexible material, is subject to a considerable amount of movement due to the minor portion of the line loads absorbed thereby, and due to expansion and contraction of the body by changes in the pressure and temperature of the pressurized lading, and due to changes in thhe ambient temperature. Since the position of the seat box unit is relatively static and since the body 12 is subject to considerable movement, the seat lubrication structure of this invention is so constructed that it will effectively bridge the space between the seat box and body wall and will not impair movement between the body and seat box structures. In addition, the seal lubrication structure effectively provides for the transmission of lubricant between the body and seat box structure under all operating conditions. As the body wall 54 moves away from or toward the seat box structure due to expansion of contraction of the body, the tube 112 will be moved axially of the bore 114 and the O-ring 120 will maintain a fluidtight seal between the tube 112 and the bore 114. Any transverse movement of the body relative to the seat box structure will only result in slight bending of the flexible tube 112. The seat lubrication structure, therefore, maintains fluid communication between the check valve assembly 126 and the seat face 134 for lubrication of the seat, even through the body and seat box structures are subject to relative movement and will in no way cause binding between the body wall and seat box structures.

In the construction of the valve the structural members 28 and 30 are welded together to form a relatively rigid seat box unit 26, and the generally cylindrical hubs 18 and 20, having the flanges 22 thereon, are joined to the seat box unit 26 by welding, as indicated in FIGURE 1, to form the load bearing core 15 of the valve. After the core 15 has been formed, it can be subjected to radiological testing for the detection of flaws in the welds thereof. Since all of the welds of the core 15 are of single material thickness, accurate radiological detection of weld imperfections is possible. The upper and lower tubular portions of the valve body, having their respective bonnet flange 66 and lower closure 58 welded thereto which can be accurately inspected radiologically, are placed about the core 15 and welded to the hub portions 18 and 20 of the central core, as illustrated in FIGURES 1 and 2. After the upper and lower portions 54 and 56 of the body have been welded to the central core 15, the body tubes 54 and 56 are welded one to the other, as illustrated at 55 in FIGURE 2, to completely close the valve body about the central core. It is now possible to magnaflux test the welds fixing the body portion of the valve to the load bearing core, the valve is ready for stress relieving, machining and final assembly. The valve seats 40 and 42 are placed within their respective seat recesses and the gate 46, having the valve stem 80 connected thereto, is placed between the seats 40 and 42 immediately prior to assembly of the bonnet 68 to the valve body.

Under most conditions, the central core portion 15 of the valve 10 will not be subjected to stresses produced by the pressurized lading. Generally the fluid pressure within the valve chamber 14 and within the flow passage 16 will be balanced. The valve body, therefore, will absorb substantially all of the stresses exerted by fluid pressure. The valve body portion of the valve, being relatively thin and flexible, will tend to flex slightly as the core 15 is subjected to line loads, however, the line loads absorbed by the valve body are considered immaterial in relation to the portion of the line loads absorbed by the load bearing core.

It is evident, therefore, that we have produced a novel fabricated valve construction, having a body portion thereof constructed of relatively thin metal, and yet which is adapted to withstand severe external line loads without impairing the sealing ability of the valve. It is also apparent that we have produced a novel fabricated valve, having weld connections which are specifically designed for radiological detection of weld imperfections. The valve, in accordance with the present invention, also incorporates a load transmitting core which is adapted to withstand the loads applied to the valve by the pipeline to which the valve is connected. The central core of the valve is so constructed that a central seat retaining portion of the core is relatively inflexible to maintain the seats of the valve in proper alignment with the gate while the conduit portions of the core are relatively flexible to allow flexing of the core under loads. The invention also includes novel seat lubrication structure which effectively provides the seats with lubrication and yet allows free relative movement between the spaced body and seat box structure. It is apparent, therefore, that we have produced a valve which is inexpensive in manufacture, light in weight and reliable in use. It is evident, therefore, that this invention is one well adapted to attain all of the objects hereinabove set forth, together with other advantages, which are obvious and inherent from the description of the apparatus itself.

It will be understood that certain features and subcombinations are of utility and may be employed without reference to other features and subcombinations.

This is contemplated by and is within the scope of the claims. As many possible embodiments may be made of the invention without departing from the spirit or scope thereof, it is to be understood that all matter hereinabove set forth or as shown in the accompanying drawings, is to be interpreted as illustrative and not in a limiting sense.

What is claimed is:

1. A gate valve comprising; a load bearing core having a pair of spaced aligned relatively flexible tubular hubs, said hubs having means for attachment of the valve to a pipeline, a generally rectangular relatively rigid seat box unit fixed to each of the hubs and having a flow passage therein in communication with said tubular hubs, said seat box unit comprising a pair of generally identical structural members welded together on opposite sides thereof, said structural members interfitting to define a generally rectangular gate passage disposed in transverse relation to said flow passage and having a pair of opposed internal seat recesses formed about said flow passage, a pair of seat assemblies movably disposed within the seat recesses, a gate disposed in said gate passage in sealing engagement with each of the seat assemblies and being selectively movable between open and closed positions to control the flow of fluid through the valve, means for imparting movement to said gate, a relatively thin relatively flexible open ended body shell surrounding said seat box unit in spaced relation therewith and being fixed to said hubs intermediate the extremities thereof, a removable bonnet closing the open end of said body, said relatively flexible body serving only as a pressure containing vessel and being capable of flexing with said tubular hubs in response to line loads and being capable of flexing relative to said seat box unit responsive to fluid pressure, flexing of said load bearing core being absorbed by said flexible tubular hubs and said seat box unit remaining relatively free of load distortion upon the application of line loads to said load bearing core, lubricant passages formed in each of said structural members and communicating with said seat recesses, a pair of lubricant fittings being fixed to said body shell and having a tubular conduit portion thereof extending across the space between the body shell and the seat box unit and being received in movable sealed relation within said lubricant passage, whereby said flexible body shell may move relative to said seat box unit without breaking fluid communication between said lubricant fittings and said lubricant passages.

2. A fabricated gate valve comprising; a load bearing core having a pair of spaced aligned generally flexible tubular hubs, said hubs having means for attachment of the valve to a pipeline, a generally rectangular relatively rigid seat box unit disposed between said tubular hubs, said seat box unit having a flow passage therein in communication with said tubular hubs, said seat box unit including a pair of generally identical structural members being welded together on opposite sides thereof, said structural members cooperating to define a substantially rectangular gate passage disposed in transverse relation to said flow passage, said structural members having an annular flange formed about said flow passage, said hubs being welded to said annular flanges to form said load bearing core, said seat box unit having a pair of opposed internal seat recesses formed therein about said flow passage, a pair of seat assemblies movably disposed within the seat recesses, a gate disposed in said gate passage in sealing engagement with each of the seat assemblies and being selectively movable between open and closed positions to control the flow of fluid through the valve, means for imparting movement to said gate, a relatively thin flexible open ended body shell surrounding said seat box unit in spaced relation therewith and being welded to said hubs intermediate the extremities thereof, upon the application of line loads to said load bearing core flexing of said core being absorbed by said tubular hubs and said seat box unit remaining relatively free of distortion, said body shell serving only as a pressure containing vessel and being capable of flexing with said tubular hubs, a removable bonnet closing the open end of said body, said body shell being capable of flexing under the effect of fluid pressure and thereby being movable relative to said seat box unit, a pair of lubricant fittings being fixed to said flexible body shell, lubricant passages formed in each of said structural members and being in communication with said seat recesses, each of said lubricant fittings having a lubricant conduit which extends inwardly of said flexible body shell and bridges the space between the body shell and the seat box unit, said lubricant conduits being received in movable sealed relation within said lubricant passages whereby fluid communication will be maintained between the lubricant fittings and the lubricant passages during movement of said body shell relative to said seat box unit.

References Cited

UNITED STATES PATENTS

| | | | |
|---|---|---|---|
| 2,788,015 | 4/1957 | Scherer | 137—246.22 X |
| 2,956,580 | 10/1960 | Heath | 137—246.12 |
| 3,078,865 | 2/1963 | Estes | 137—246.22 |

CLARENCE R. GORDON, *Primary Examiner.*

U.S. Cl. X.R.

251—327, 328, 329